(12) United States Patent
Brussin et al.

(10) Patent No.: US 9,754,274 B1
(45) Date of Patent: Sep. 5, 2017

(54) SINGLE TAG METHOD FOR WEBPAGE PERSONAL CUSTOMIZATION

(75) Inventors: David Ian Brussin, Berwyn, PA (US); Jeffrey James Persch, Ardmore, PA (US); Thomas William Janofsky, Jenkintown, PA (US); Luke Gabriel Walker, Philadelphia, PA (US); David Israel Bookspan, Philadelphia, PA (US)

(73) Assignee: Monetate, Inc., Conshohocken, PA (US)

( * ) Notice: Subject to any disclaimer, the term of this patent is extended or adjusted under 35 U.S.C. 154(b) by 182 days.

(21) Appl. No.: 12/797,370

(22) Filed: Jun. 9, 2010

Related U.S. Application Data

(60) Provisional application No. 61/185,483, filed on Jun. 9, 2009.

(51) Int. Cl.
*G06Q 30/02* (2012.01)

(52) U.S. Cl.
CPC ..... *G06Q 30/0207* (2013.01); *G06Q 30/0241* (2013.01)

(58) Field of Classification Search
CPC ....................... G06Q 30/0207; G06Q 30/0241
USPC .............................................. 705/14.1–14.73
See application file for complete search history.

(56) References Cited

U.S. PATENT DOCUMENTS

| 6,317,722 | B1 * | 11/2001 | Jacobi et al. | 705/14.51 |
| 6,519,571 | B1 * | 2/2003 | Guheen et al. | 705/14.66 |
| 7,013,290 | B2 * | 3/2006 | Ananian | 705/26.42 |
| 7,050,989 | B1 * | 5/2006 | Hurt et al. | 705/14.51 |
| 7,113,917 | B2 * | 9/2006 | Jacobi et al. | 705/14.53 |
| 7,302,696 | B1 * | 11/2007 | Yamamoto | G06Q 30/02 348/E7.061 |

(Continued)

FOREIGN PATENT DOCUMENTS

| WO | WO 0111504 A2 * | 2/2001 | ............. G06Q 30/02 |
| WO | 0127801 A2 | 4/2001 | |
| WO | 2009045450 A1 | 4/2009 | |

OTHER PUBLICATIONS

Interwoven, Autonomy Optimost, http://interwoven.com/components/pagenext.jsp?topic=PRODUCT::OPTIMOST, viewed on web on Jul. 21, 2008, San Jose, CA.

(Continued)

*Primary Examiner* — Sam Refai
(74) *Attorney, Agent, or Firm* — Clocktower Law; Erik J. Heels; Michael A. Bartley (57) ABSTRACT

An e-commerce solution includes a website, created or pre-existing, comprised of web pages each having a single code snippet with reference to a promotion server. Upon access by a visiting customer, the single code snippet is executed in the customer's web browser to retrieve customized or promotional code. The promotional code may modify the existing webpage elements to add, remove, or modify webpage elements and display dynamic, personalized messages and offers within the existing webpage. Through inclusion of the same single snippet on all web pages, visitors may be tracked throughout the website to present consistent messages and carry promotional offers through order checkout. Management of promotions through a web interface and the single snippet allows integration and operation with existing websites without extensive technological effort or expense.

12 Claims, 10 Drawing Sheets

(56) References Cited

U.S. PATENT DOCUMENTS

| | | | |
|---|---|---|---|
| 7,483,871 B2* | 1/2009 | Herz | |
| 7,499,948 B2 | 3/2009 | Smith | |
| 7,778,884 B2* | 8/2010 | Bamborough et al. | 705/14.36 |
| 7,904,503 B2* | 3/2011 | Van De Sluis | 709/203 |
| 8,244,593 B2* | 8/2012 | Klinger et al. | 705/26.1 |
| 2002/0046109 A1* | 4/2002 | Leonard et al. | 705/14 |
| 2002/0111855 A1* | 8/2002 | Hammerstad | G06Q 30/02 705/14.56 |
| 2003/0225632 A1* | 12/2003 | Tong et al. | 705/27 |
| 2005/0135596 A1* | 6/2005 | Zhao | 379/265.01 |
| 2005/0144073 A1* | 6/2005 | Morrisroe et al. | 705/14 |
| 2006/0080257 A1 | 4/2006 | Vaughan | |
| 2006/0149623 A1* | 7/2006 | Badros | G06Q 30/02 705/14.66 |
| 2006/0195428 A1* | 8/2006 | Peckover | 707/3 |
| 2007/0146812 A1* | 6/2007 | Lawton | 358/452 |
| 2007/0206584 A1 | 9/2007 | Fulling | |
| 2007/0271156 A1* | 11/2007 | Sarusi et al. | 705/27 |
| 2007/0282693 A1* | 12/2007 | Staib | G06Q 30/02 705/26.5 |
| 2008/0162574 A1 | 7/2008 | Gilbert | |
| 2008/0221997 A1* | 9/2008 | Wolfe | 705/14 |
| 2008/0228819 A1 | 9/2008 | Minnis | |
| 2008/0270398 A1 | 10/2008 | Landau | |
| 2008/0270977 A1 | 10/2008 | Nucci | |
| 2008/0281617 A1 | 11/2008 | Conrad | |
| 2009/0024700 A1* | 1/2009 | Garg et al. | 709/203 |
| 2010/0100415 A1* | 4/2010 | Plummer et al. | 705/10 |

OTHER PUBLICATIONS

Omniture, Test and Target, http://www.omniture.com/en/products/conversion/testandtarget, viewed on web on Jul. 21, 2008, Orem, UT.

Sitebrand, Solutions Overview, http://www.sitebrand.com/solutions/, viewed on web on Jul. 21, 2008, Quebec, Canada.

* cited by examiner

Fig. 1

```
<script
src="http://monetate.com/a.js
type="text/javascript">
</script>
```

Fig. 2

```
<html>
<head>
<title>Example Page</title>
</head>
<body>
This page has an example Monetate javascript tag.
<!-- Begin example Monetate tag; place before end of document body. -->
<script type="text/javascript">
var monetateT = new Date().getTime();
if (document.location.protocol == "http:" || document.location.protocol == "https:")
{ document.write(unescape("%3Cscript type='text/javascript' src='" +
(document.location.protocol == "https:" ? "https://s" : "http://") + ".monetate.net/js/1/
x-12345678/x/account" + Math.floor(monetateT / 3600000) + "%3E%3C/script%3E"); }
</script>
<script type="text/javascript">
if (this.monetate) { monetate.a(); }
</script>
<!-- End example Monetate tag. -->
</body>
</html>
```

New Site Location

Product detail page

Product detail page as overlay

Product detail pages banner in brand

Product detail pages left vertical banner in brand

Product detail pages right vertical banner in brand

Product detail pages as banner in category

Product detail pages left vertical banner in category

Product detail pages right vertical banner in category

Product detail page as banner

Product detail page as left vertical banner

Product detail page as right vertical banner

All product detail pages as banner

All product detail pages as left vertical banner

All product detail pages as right vertical banner

Any page

All pages as banner

All pages as left vertical banner

All pages as right vertical banner

Brand page

Brand page as banner

Brand page as left vertical banner

Brand page as right vertical banner

All brand pages as banner

All brand pages as left vertical banner

All brand pages as right vertical banner

Home page

Home page as banner

Home page as left vertical banner

Home page as right vertical banner

Home page as pop up

Search page

All search pages as banner

All search pages as left vertical banner

All search pages as right vertical banner

Category page

Category page as banner

Category page as left vertical banner

Category page as right vertical banner

All category pages as banner

All category pages as left vertical banner

All category pages as right vertical banner

Order pages

Login page as banner

Shopping cart page as banner

Shopping cart page as left vertical banner

Shopping cart page as right vertical banner

Shopping cart page as pop up

SINGLE TAG METHOD FOR WEBPAGE PERSONAL CUSTOMIZATION

CROSS-REFERENCE TO RELATED APPLICATIONS

This utility patent application claims priority from U.S. provisional patent application Ser. No. 61/185,483, filed Jun. 9, 2009, titled "SINGLE TAG METHOD FOR WEBPAGE PERSONAL CUSTOMIZATION" in the name of David Ian Brussin, Jeffrey James Persch, Thomas William Janofsky, Luke Gabriel Walker, and David Israel Bookspan.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2010, Monetate, Inc.

BACKGROUND OF THE INVENTION

Field of the Invention

This disclosure relates to providing website content. More specifically, the disclosure relates to providing customized, dynamic website content. Even more particularly, the disclosure relates to visitor-specific, dynamically customized promotions and/or messaging on e-commerce websites.

Background

Electronic commerce (e-commerce) transacted at Internet web pages has become a major source of retail sales. While some traditional sales and advertising practices are useful in e-commerce, there are also significant differences. For example, e-commerce websites lack the personal interaction that a salesperson can provide. Similarly, e-commerce websites generally lack personalization tailored to individual customers. Personalizing e-commerce can take many forms, and include tailored recommendations or offers based on shopping history, items viewed, referring pages, or other criteria. Personalization has shown to provide significant increases in e-commerce sales.

DESCRIPTION OF PRIOR ART

There have been many attempts and strategies to personalize e-commerce websites. An e-commerce website may be designed from inception to include all desired personalization. Such a design is generally expensive and involves significant effort in software and technology development. Existing websites may similarly be completely recreated, which incurs a significant portion of the cost of building a new e-commerce website. Alternative customization of an existing site may involve personalizing, only specific portions or adding personalized parts. This is also an expensive, custom solution. There are also some generic personalization systems designed to be used or integrated into existing e-commerce websites. These solutions still require customization of existing web pages to interact with solution specific application programming interfaces (APIs). These solutions still require significant expense or effort to redesign existing websites to work with personalized content, and generally require designated placeholder tags or regions for the personalized content to be displayed. Such solutions may result in broken or apparently empty regions should the personalization system service be interrupted, and are limited in the variety of content and promotions they can provide and underlying e-commerce platforms they can operate with.

U.S. Pat. No. 7,050,989 "ELECTRONIC COMMERCE PERSONALIED CONTENT DELIVERY SYSTEM AND METHOD OF OPERATION" (Hurt, May 23, 2006) discloses, in the Abstract, a system where "Client web pages reside upon client web servers and upon third party web servers and contain personalized content delivery code (PCDC), which is executed when a customer computer receives the web page. Upon execution of the PCDC, the customer computer sends a query across the Internet to the content management server, the query identifying the client and the customer computer identity and may include a secondary client identifier. In response to the query, the content management server identifies personalized content corresponding to the client and to the customer computer identity. The personalized content is an image, an executable file, video content, audio content, streamed media, a banner ad or other content. The personalized content address and additional information is then returned to the customer computer, which then retrieves the personalized content for presentation to the e-commerce customer."

None of the above provides an e-commerce solution allowing personalized content to be delivered and integrated into existing web page content with a standard, one-size-fits-all change to existing web page code, allowing complex, personalized promotions to be offered and integrated into existing e-commerce shopping carts without transmission of additional codes or other integration such as placeholders added to existing content. What is needed, therefore, is an e-commerce solution that overcomes the above-mentioned limitations and includes the features enumerated above.

BRIEF SUMMARY OF THE INVENTION

This disclosure details an e-commerce solution allowing insertion of a single, static code snippet into existing webpages. The snippet accesses and integrates dynamic, personalized content into the existing webpages and underlying e-commerce sales model. Personalization may include adding new content (and adjusting the layout of other components to make room as necessary), replacing existing content, removing existing content, and/or overlaying whitespace or existing content with new content (such as, but not limited to, displaying a second image on top of a portion of an existing image). Management of promotions and personalized content may be performed through a separate management interface. When a customer or visitor accesses a webpage having the single code snippet, the snippet is executed within the visitor's web browser to access a Promotion Server and dynamically operate any personalized content.

Features and Advantages

This solution provides a simple to implement solution using the same, single code snippet on all webpages. Integration to existing e-commerce websites or inclusion in design of new websites may be done without extensive or expensive technical modifications.

This solution integrates personalized, dynamic content into existing webpages. No alteration of existing pages or creation of new pages or popup windows is required. Further, no specific customer tracking, such as passing of visitor identifiers, is needed. The single code snippet accesses code to both fully track visitors and dynamically work with existing webpage document object models.

This solution provides a simple means to configure complex promotion or dynamic content without requiring extensive training, technical expertise, or customization of existing. A "who" "what" "where" "when" structure may define all promotions or dynamic content. By scraping or inputting existing webpages, a Promotion Server is able to identify all appropriate or available locations for content across single or multiple pages.

This solution provides a means to both display dynamic content within e-commerce web pages and integrate promotions into e-commerce shopping cart software. By tracking visitors and promotions, upon viewing shopping cart contents or checking out to pay, coupons or dynamic price alterations may be entered through the single code snippet to appropriately handle all promotions with all e-commerce solutions. By tracking a complete catalog of available items, options, and sales offers, complete integration with any existing e-commerce shopping cart technology is enabled through use of the single code snippet.

BRIEF DESCRIPTION OF THE DRAWINGS

In the drawings, closely related figures and items have the same number but different alphabetic suffixes. Processes, states, statuses, and databases are named for their respective functions.

FIG. 8 is an example management screen for configuring where promotions are displayed.

DETAILED DESCRIPTION OF THE INVENTION, INCLUDING THE PREFERRED EMBODIMENT

Figure 1:
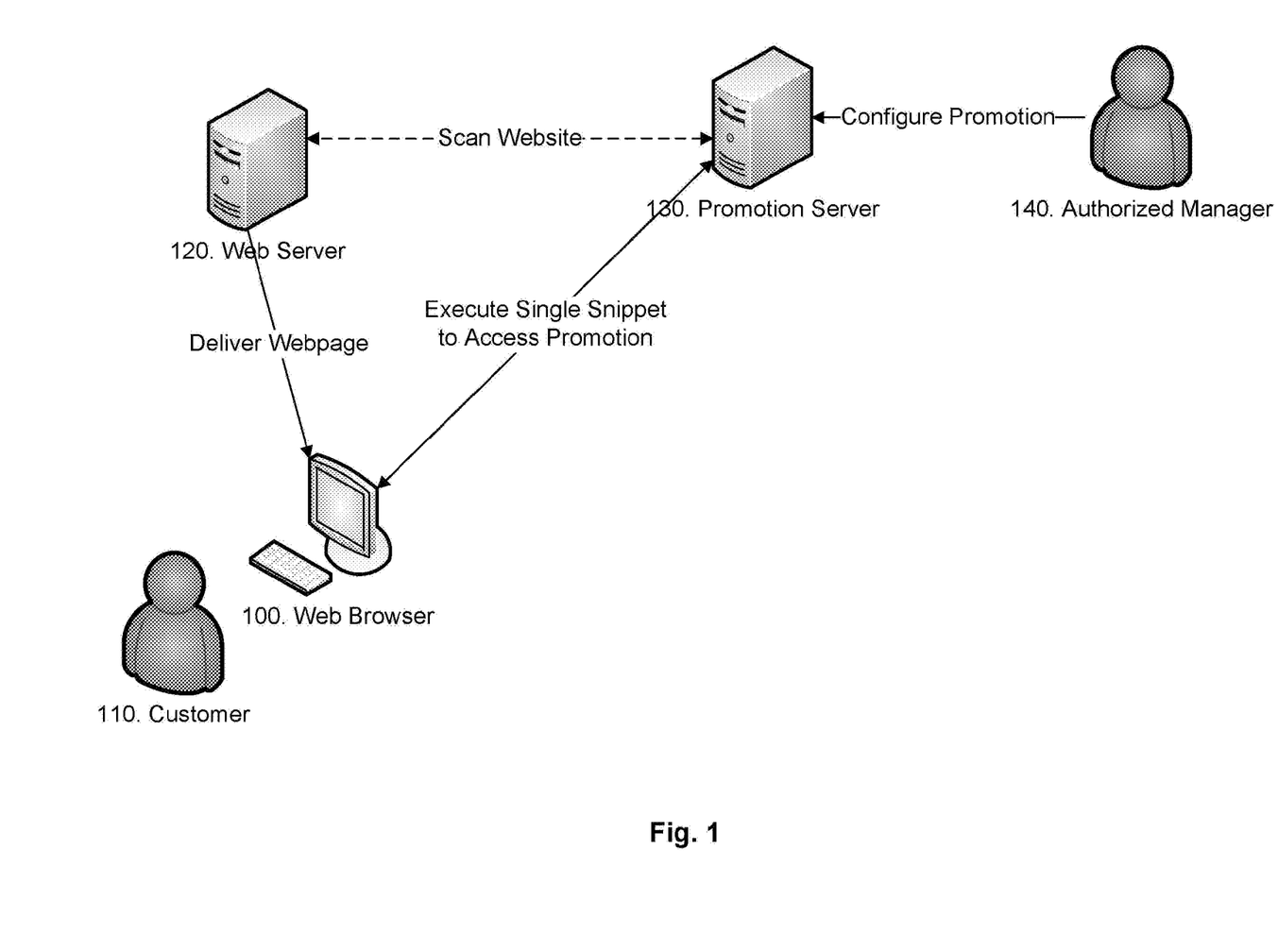
FIG. 1 is diagram of the components of the e-commerce system.

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.
Operation Referring to FIG. 1, an e-commerce solution for providing personalized dynamic content or promotions (hereinafter "promotions") is shown. Web browser 100 operated by visitor or customer 110 accesses a webpage delivered by webserver 120. On rendering the webpage, the browser executes a code snippet which may access code on promotion server 130. The promotion server delivers code to the browser to collect information, including, but not limited to, the identification of the browser, the current page type and content, the technographic context of the page including, but not limited to, cookies and referrer information, and other page appropriate information such as, but not limited to, products, brands and categories present. The promotion server may access stored data on past visits by the identified browser, as well as correlated data such as, but not limited to, the geographic location of the identified browser, the weather conditions in that geographic locations, the proximity of retail stores in the e-commerce company brand, the proximity of competitive retail stores, or the UPS or other carrier shipping zone or cost. The promotion server identifies if there is an applicable promotion, and if so delivers code to the browser to add to, delete from, or otherwise modify the current webpage to display, track, or act upon the promotion. In order to provide a promotion, a promotion may be configured on the promotion server by authorized manager 140. In order to configure a promotion, information about each webpage in the website may be input or programatically scraped by the promotion server.

Figure 2:
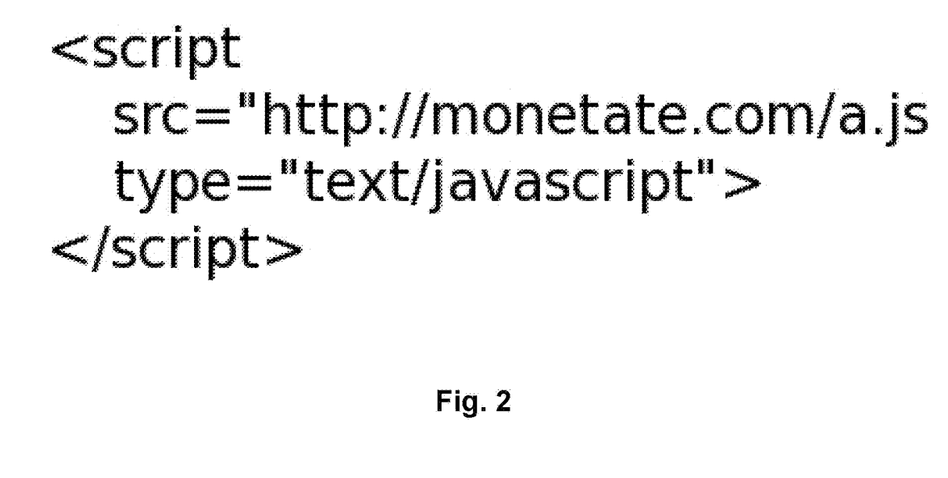
FIG. 2 is a display of a small single code snippet.
Figure 3:
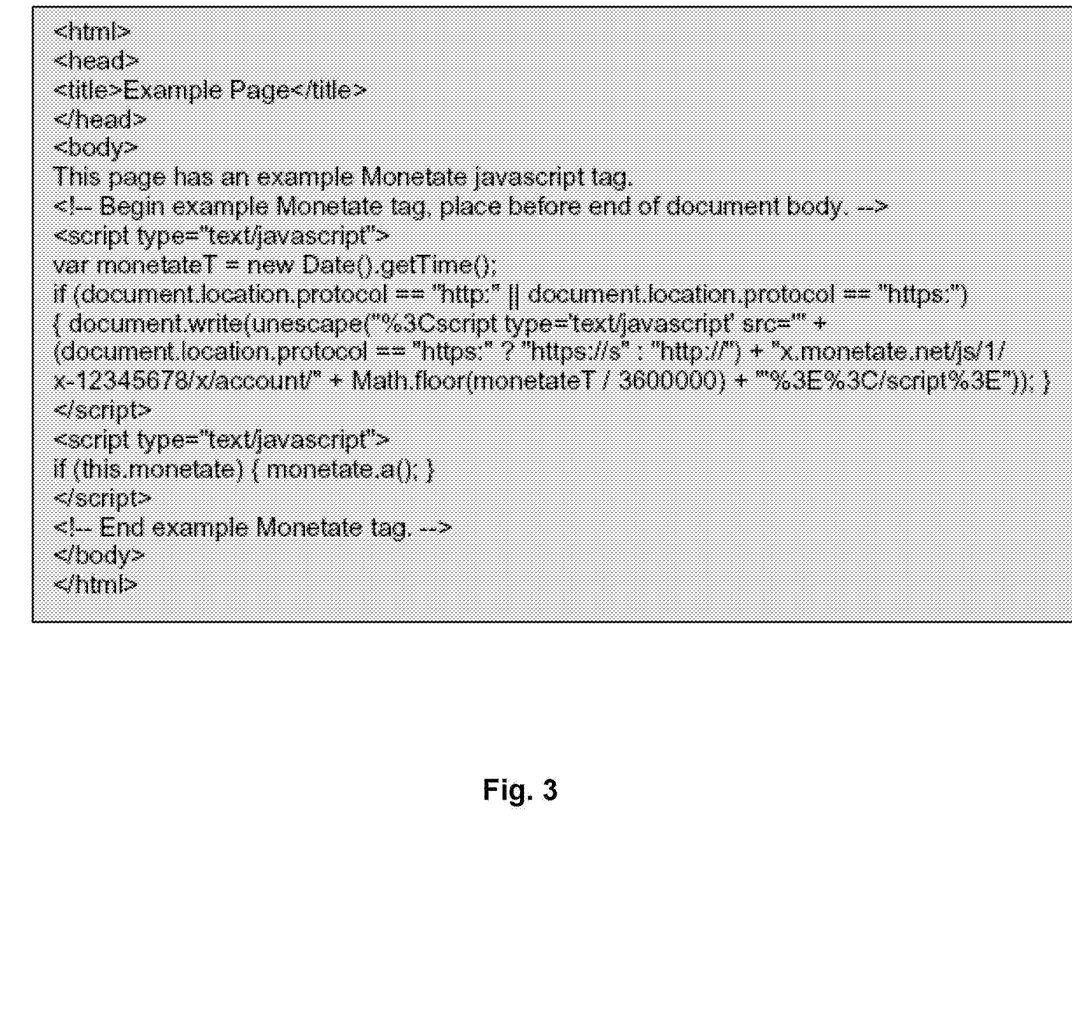
FIG. 3 is a display of a large single code snippet with error checking.

In order to implement the invention in an e-commerce website, new website pages may be designed from scratch or existing website pages may be used. No website redesign or significant integration project is required. Instead, a single code snippet, which may be Javascript in a preferred embodiment, may be added to each website page where promotions are desired. FIG. 2 shows an example minimal snippet. Alternatively, FIG. 3 shows a larger snippet which may be used. The larger snippet adds error checking to ensure the promotion server is available and avoid delays in loading a webpage in the event of errors.

In the preferred embodiment using a javascript snippet, the only requirement is inclusion of the snippet within a webpage HTML before the end of the "body" section of the webpage. The snippet may be inserted or edited into existing pages, or added to dynamically generated webpages by web server software. The same snippet may be used on all webpages, or limited to those pages where promotions desired. For example, sitemap or terms of use pages are unlikely to need personalization.

The snippet added to every page may be the same snippet. There need not be any customized code to any specific website page. Using a uniform snippet eases integration with existing websites.

In addition to adding the single snippet to each web page, promotion insertion and modification points must be identified. This may be done manually, or by "scraping" the site to programatically view all webpages. The document object model (DOM) for each identifies the location and layout of the elements displayed on a webpage. Elements may include, but are not limited to, text, tables, images, links, form elements, or other webpage objects. A mapping of the DOM of each page may stored on the promotion server. In addition to scraping page object and layout information, a catalog of sales items may also be stored on the promotion server. Such a catalog may be manually entered, or programatically scraped along with the page-specific information. The catalog may be created and updated by regularly and automatically crawling site content, ensuring that the data used is exactly consistent with that which would be encountered by a site visitor. Information scraped and included in the catalog may include, but is not limited to, each brand, category/subcategory and product, for use in segmentation, targeting, testing, site experience changes, and analytics without data feeds or back-end integration. Additional relevant data such as, but not limited to, ratings, reviews, and in-stock status, may be included in the catalog as appropriate. The collection of DOM information and product catalog is sufficient to begin creation of promotions.

Figure 4:
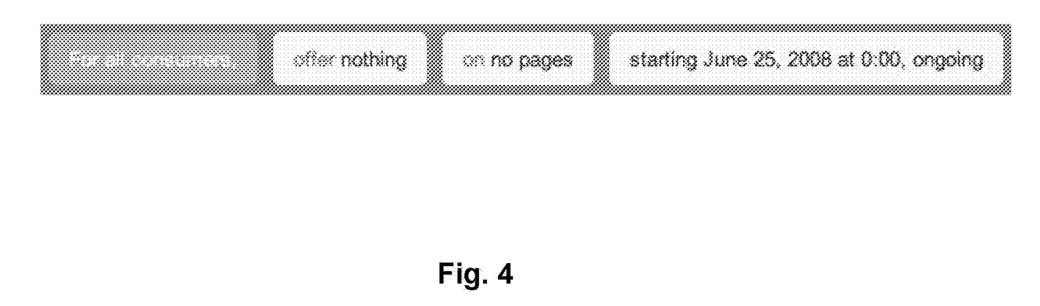
FIG. 4 is a display of an empty promotion before configuration.
Figure 5:
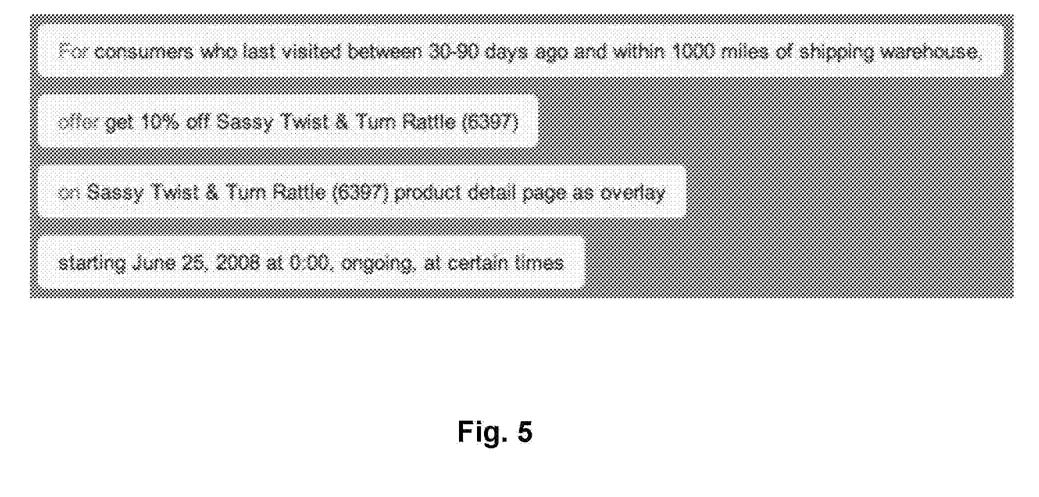
FIG. 5 is a display of a configured promotion.

Generation of promotions may be done through a management interface. The preferred embodiment utilizes a web interface to create promotions, although other creation methods may be used. The result of a created promotion is javascript code specific to individual pages of the e-commerce website. This created code may insert, modify, or delete objects from the existing page DOM. For example, the code may create instructions to overlay a 10% off sales image on other images, or to add text detailing a promotion, or other dynamic and personalized content. The preferred embodiment creates and displays promotions to define who, what, where, and when, as shown in FIGS. 4-5. "Who" identifies the targets of a promotion, and may be based on any trackable factor. Such factors include, but are not limited to, webpages or items viewed this or any prior visit, frequency of site visits, size of current shopping cart or prior purchases, referring websites, or geographic location. "What" refers to the promotion or dynamic message. Any type of sales offer or specific content, such as, but not limited to, text or images, may be configured. "Where" refers to the location the "what" is displayed. "Where" may be, but is not limited to, individual pages, groups of pages, association with all displays of a specific item or group of items, and may be added to specific individual or multiple locations within a page. "When" identifies when to display the promotion or dynamic content, allowing time specific control.

When a web page is accessed that includes the code snippet, the code snippet is executed on rendering a page in a web browser. The snippet accesses javascript code specific to that page on the promotion server. On the access request, the promotion server determines if there are any promotions to be displayed. If there are promotions, code to display or modify the web page for such promotions is triggered to execute by the code snippet. Determination of such a promotion may be done based on if there is a promotion for the visitor ("Who") that is displayable on the webpage being visited ("Where") during an active promotion ("When"). In the preferred embodiment, javascript code for a promotion is accessed and executed through the code snippet. Javascript allows dynamic alteration of the DOM, allowing insertion, modification, or removal of webpage elements or objects, such as, but not limited to, text and images. Should no promotion be available, or should the promotion server be unavailable for any reason, the existing webpage will be displayed without the dynamic alteration still allowing presentation of a functional webpage without any apparent missing elements or placeholders for the promotion.

Visitors may be identified upon their return to an e-commerce site by the use of sole or combined technology such as, but not limited to, HTTP cookies, Adobe Flash shared data objects, and browser technographic profiling. In a preferred embodiment, the HTTP cookies are first party cookies in the domain of the e-commerce site.

In addition to delivering promotional content for display, sales promotions or special offers displayed may be integrated into the e-commerce transaction system used to allow online purchasing. There are many various models for e-commerce transactions, with most featuring a shopping cart which may be filled with items to purchase, and then a checkout or payment page to confirm the items for purchase and enter payment information. Sales promotions and offers may be dynamically integrated into the e-commerce transactions by Including the same code snippet on all pages involved. Based on items selected, included in the shopping cart, or other promotions associated with the webpage visitor ("Who"), the preferred embodiment may use the javascript snippet to access javascript to modify the DOM of webpages displaying items or shopping cart contents to display the promotions or offers in varying ways, including, but not limited to, separate lines indicating the offers or savings, or alteration of existing prices to display the promotional cost. These promotions may be added to checkout pages as one-time or static coupon codes, or otherwise input to the e-commerce system at checkout via e-commerce system capabilities such as, but not limited to, coupon code fields, promotion code fields, and referrer code capabilities, while consistently displayed to the webpage visitor in the same, or any desired variation, manner across all webpages.

Figure 6:
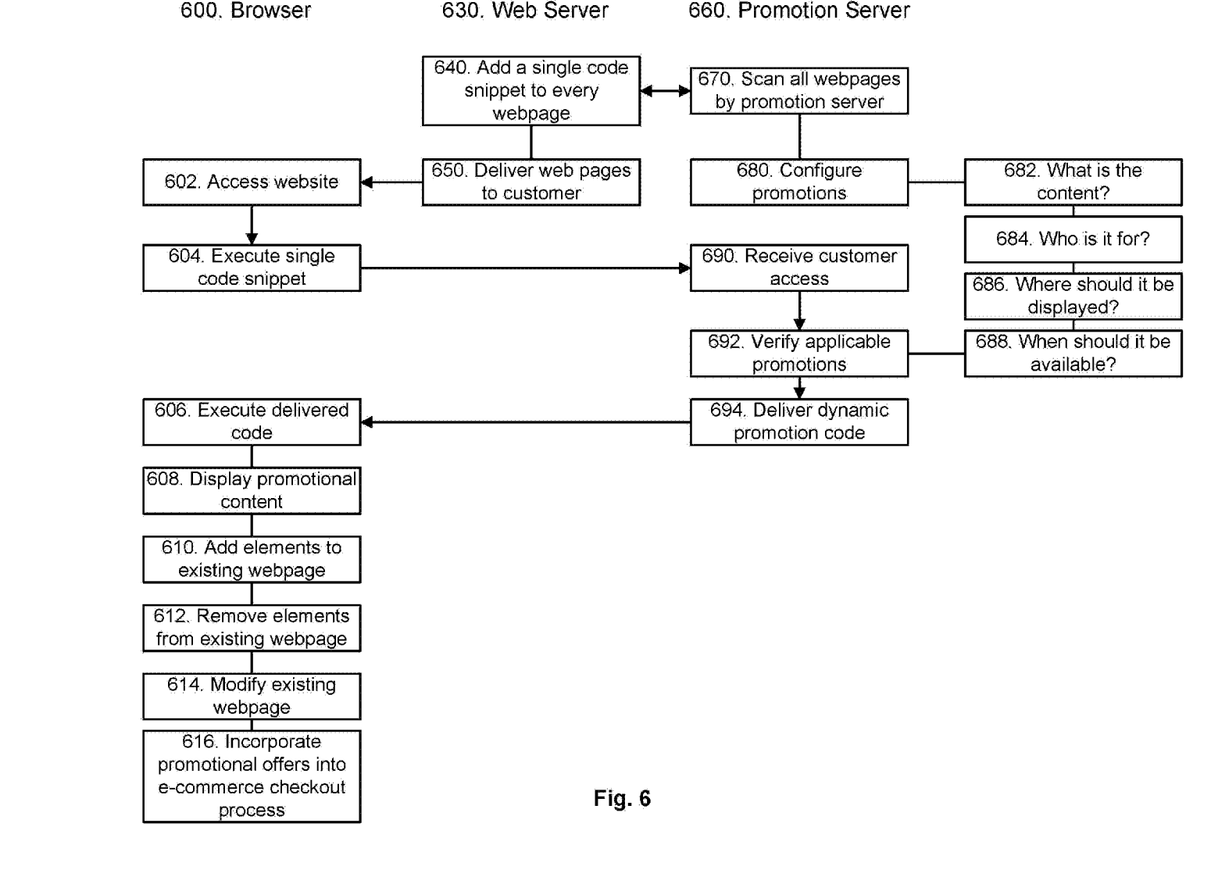
FIG. 6 is a flowchart showing operation of the e-commerce dynamic personalization system.

FIG. 6 shows a flowchart of interactions between different elements, including web browser 600, web server 630, and promotion server 660. To enable functionality, the code snippet is added 640 at the web server to every page which may be involved in a promotion. The promotion server may then scrape or scan 670 all available web pages from the web server. Once scanned, catalogs may be dynamically built and promotions may be configured 680 to determine what 682 content for whom 684 displayed where 686 and available when 688. Separate from the promotions, the web server may deliver 650 web pages to customer web browsers accessing 602 the website. On access, the web browser will execute 604 the code snippet, which in turn accesses 690 the promotion server. The promotion server may verify 692 any applicable promotions and deliver 694 dynamic promotion code. The delivered code may execute 606 within the customer browser and display 608 promotional content by adding 610 elements to the existing webpage, removing 612 elements from the existing webpage, modifying 614 existing webpage elements, or performing a combination of the actions. Promotional offers may then be integrated 616 into the e-commerce checkout process.

Figure 7:
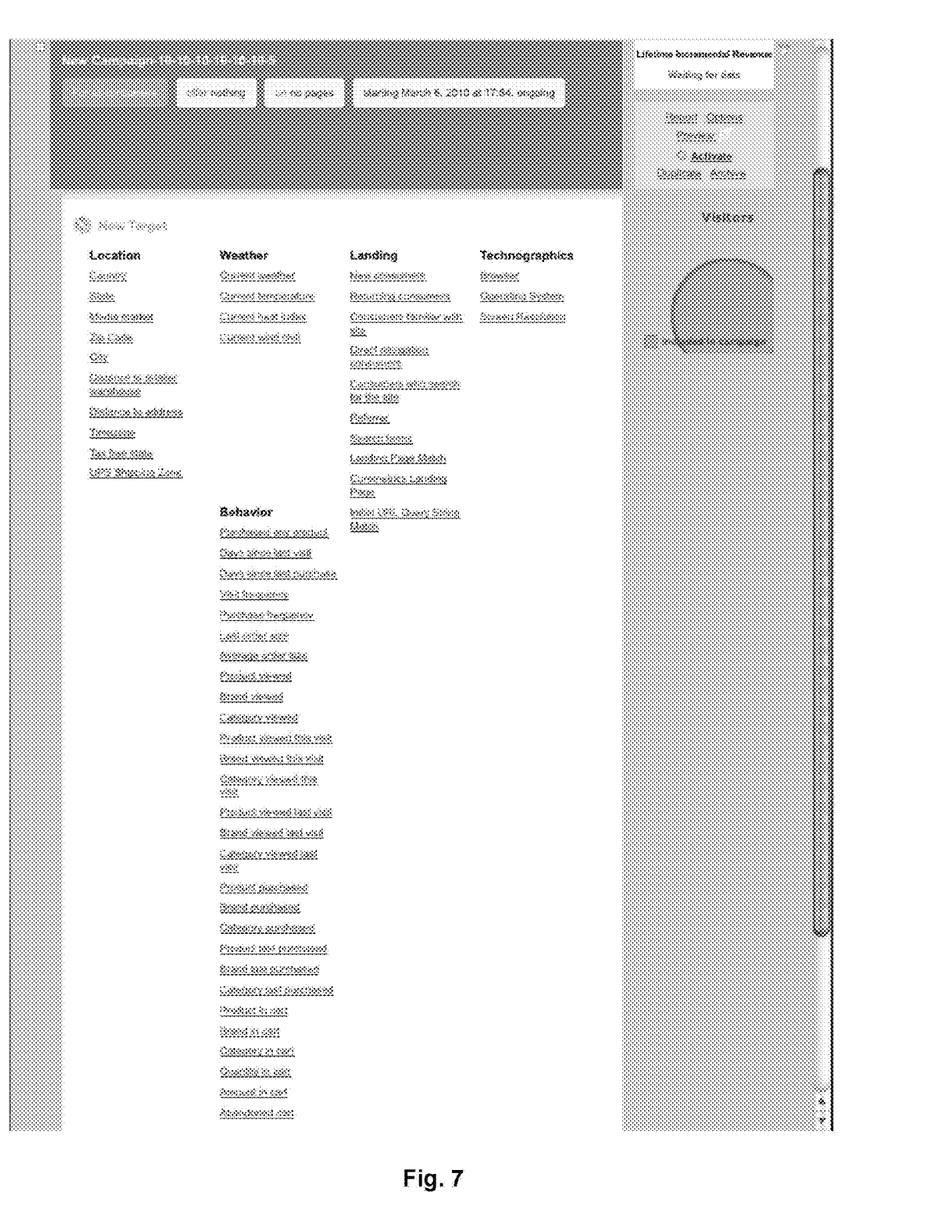
FIG. 7 is an example management screen for configuring restrictions on is offered a promotion.
Figure 9:
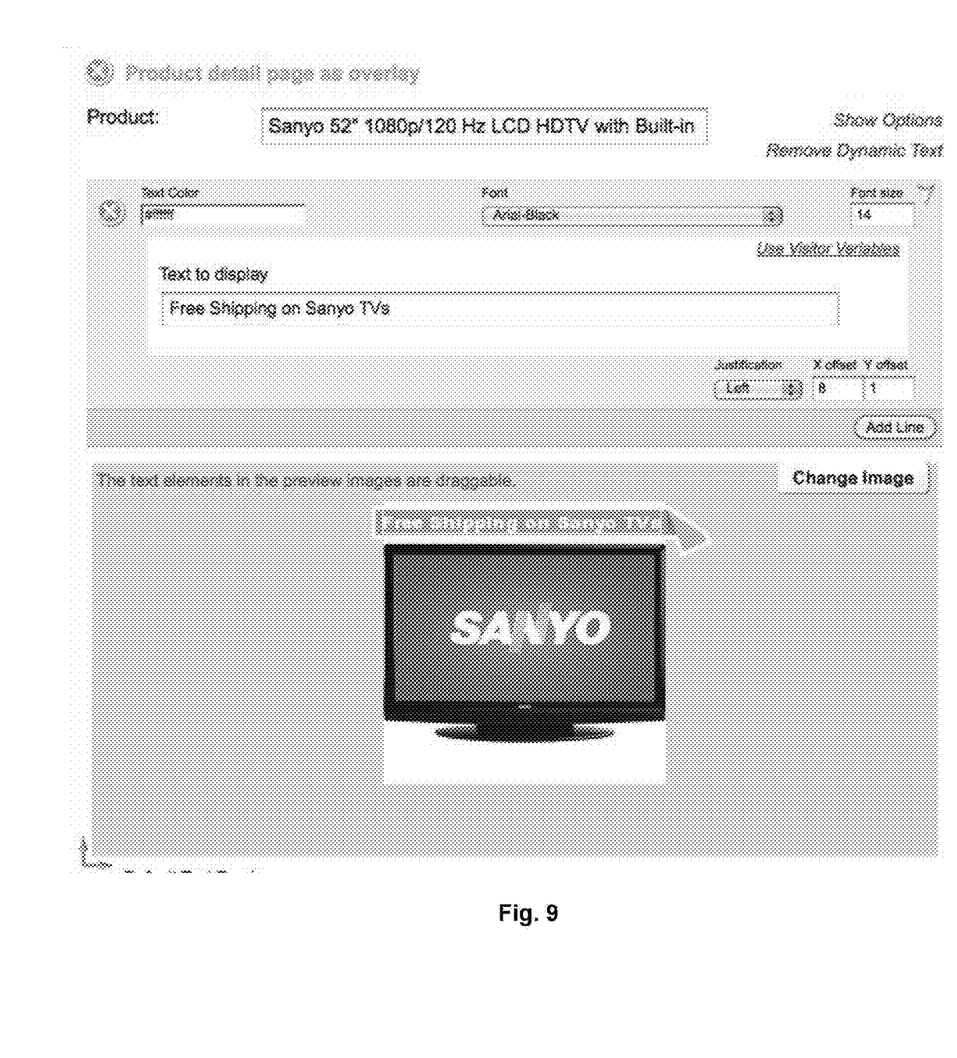
FIG. 9 is an example specific promotion for configuring text on a product image involved in a promotion.
Figure 10:
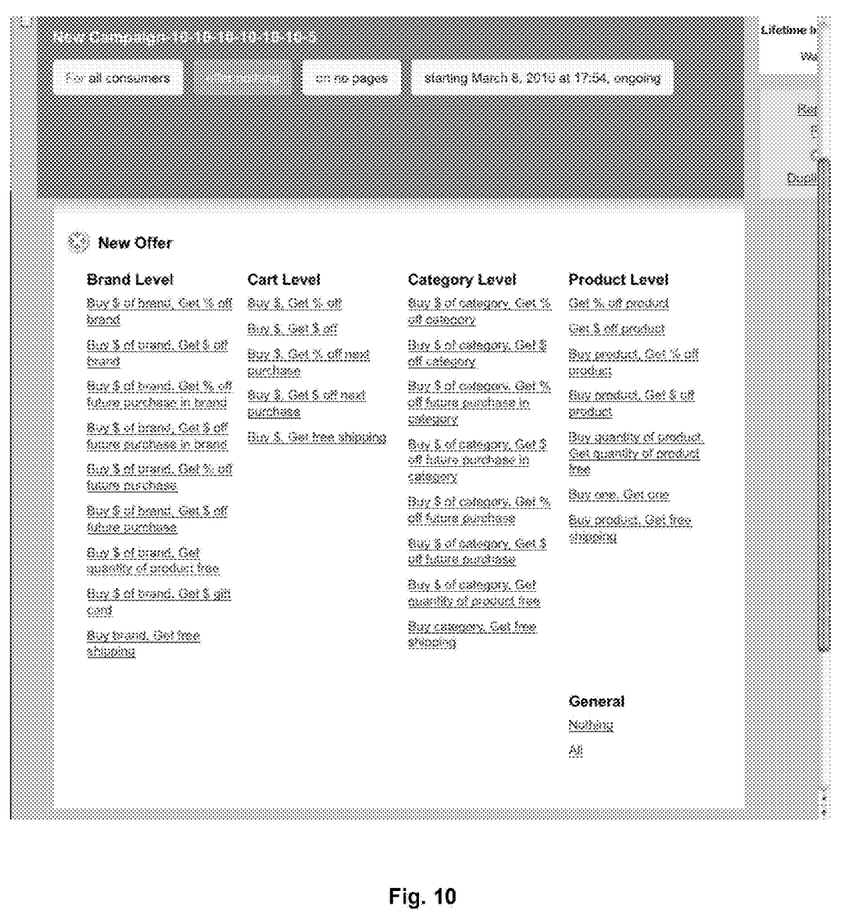
FIG. 10 is an example management screen for configuring promotional offers.

FIGS. 7-10 show example management screens for configuring a promotion. Specifically, FIG. 7 shows a management screen to identify "who" a promotion is for. FIG. 8 shows a management screen to identify "where" a promotion is displayed. FIG. 10 shows a management screen to identify "what" promotion is offered. And FIG. 9 shows configuration of dynamic elements configurable as part of a promotion. Other options for configuring dynamic elements, besides text as shown in FIG. 9, include but are not limited to:

Creative insert in automatically created space
Creative overlay on any element or whitespace
Creative replace
Pop-up panel
Pop-up window
Lightbox
Badge overlay on thumbnail
Element restyle
Element remove In addition to providing a promotion, the code snippet and related dynamic code may collect information about customers. By tracking interactions between each visitor and the website, including all interactions with the catalog, every search, view, cart, abandon, and purchase action on every product, brand, and category may be stored for each visitor across every visit. This tracked behavior may in turn be used to deliver personalized or behavior profile-specific promotions.

In a preferred embodiment, the primary interface to the system operates via a single static JavaScript tag inserted into an e-commerce website's HTML pages or page template. This tag is the same on all pages of the website or multiple websites. The system requires no other changes to page structure or content in order for information to be extracted or for content to be displayed.

No catalog information from the e-commerce website owner is required by the system. In a preferred embodiment, the system builds catalog information by crawling the publicly accessible website and storing key product information. The system may infer relationships such as, but not limited to, product category or brand from page content as well as website structure. Additional information about products listed on the website may be derived from end user visits and used to further supplement the system's catalog state.

The JavaScript tag operates by downloading an additional JavaScript script specific to that e-commerce website and appending that additional script dynamically to the page as rendered in an end-user's browser. This additional script is then executed. This additional script may obtain static resources from the back-end service and collect information about the current browser and page execution environment. It may obtain end user identity via a number of different mechanisms such as, but not limited to, end user tracking via HTTP cookie state, Adobe Flash cookie, additional customer provided identity or browser technographic profiling. The additional script may collect commerce specific information about the current webpage such as, but not limited to, products currently being viewed as well as technographic information. All collected data may then be sent to the back-end service via an HTTP API call.

In a preferred embodiment, the API call may be received by a multi-tier software stack. The topmost tier may handle SSL termination, HTTP load balancing and proxying. The application tier may handle message processing and rule execution, as well as data and content caching. The data tier may store current and historical information about end user sessions.

In a preferred embodiment, the application tier may be a Python server program. It may collect data from the API call and supplement it with additional derived data such as, but not limited to, IP geo-location, current weather conditions, and historical customer behavior such as, but not limited to, products viewed, added to the cart, purchased or abandoned. Additional information from the context of the end user request such as, but not limited to, landing URL, referring site, and the in-stock status of the viewed product may be captured and recorded in the data store.

The Python server may evaluate a customer specific set of rules to determine if the page content being displayed to the end user should be modified. These rules can be targeted on an extensive set of criteria such as, but not limited to, location, current weather condition, how the end user arrived at the site, the catalog state of the customer, or past on-site behavior of the end user.

If the end user qualifies for a given rule, the Python server may determine if there are any additional requirements such as, but not limited to, brand or quantity to be purchased. Qualification for these offers may result in a coupon code that may be applied for a discount to the end user.

Any given rule may modify zero or more locations on the end user browser page.

Once the set of rules is determined, a JavaScript Object Notation (JSON) formatted object may be constructed by the Python server and returned to the end user. Additionally, all accumulated data and decisions may be recorded in the data store.

The JSON object returned to the end user browser contains a set of instructions for content modification on the end user page. These modifications may add, modify, or delete any content in the process of being displayed to the end user.

Additionally, the JSON response may indicate that the end user has qualified for a coupon code. This code may be stored in an end user side state and applied automatically for the end user.

OTHER EMBODIMENTS

A preferred embodiment presents an Information Technology-(IT)-free solution for customizing the shopping experience for e-commerce. In comparison of an online store to a physical store, the e-commerce solution changes the signage in the store to address the desires of each shopper walking down an aisle. The solution allows manufacturers to offer promotions directly on retailers' websites, allows a clearinghouse for manufacturers' co-operative marketing dollars, and manages co-operative campaigns for e-commerce.

Another aspect allows a large repository of shopper-specific data, which may be stripped of Personally Identifying Information to address privacy concerns. This data may be aggregated from customers that wish to contribute to and benefit from repository of network data. The onsite experience may be personalized further for visitors based not only on the individual visitor's history with the e-commerce site, but based upon the visitor's history with all participating customers aggregated in the repository. The solution allows e-commerce merchants to customize their traffic acquisition channels (for example, but not limited to, paid, organic, e-mail, display, affiliate, direct navigation) for specific recipients. The solution may use everything stored in the repository and everything that an e-commerce merchant knows about a specific visitor to customize the message or promotion that is most likely to resonate with that visitor and create the desired response. The solution offers dynamic merchandising to present the visitor with the products they are most interested in, and the information necessary to evaluate the product.

Another aspect allows e-commerce to predict each shopper's price sensitivity for each item of merchandise, and allows the merchant dynamically to optimize price for individual shoppers. The solution may also dynamically create customized pages on an e-commerce site throughout a visitor's session to personalize the experience for the visitor and motivate the behavior that the e-commerce merchant desires.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A dynamic personalization e-commerce system, comprising:
   a web server;
   a promotion server;
   one or more promotions on said promotion server;
   one or more webpages on said web server, wherein said webpages each have the same single code snippet in addition to displayable webpage content, wherein the single code snippet is not associated with any specific advertising region within the displayable webpage content, and wherein the single code snippet references the promotion server without identifying any specific promotion;

wherein upon access, from a web browser of a visiting client to a webpage in the one or more webpages, the single code snippet programmatically communicates with the promotion server to access any of said promotions determined by the promotion server as available for display; and wherein said promotions contain code to add to, modify, or delete from the displayable webpage content while rendering, within the web browser, the webpage during the webpage access and said code has access to add, modify, or delete any element within a document object model of the webpage.

2. The dynamic personalization e-commerce system of claim 1, wherein the promotion server includes storage containing a catalog of all available items, categories, and brands programmatically scraped from the one or more webpages, and the document object model of the webpage and a document object model of each other webpage of the one or more webpages.

3. The dynamic personalization e-commerce system of claim 2, wherein the promotion server is configured to track all visiting clients from a first visited page to a last visited page.

4. The dynamic personalization e-commerce system of claim 3, wherein the promotions on the promotion server further include code to dynamically insert coupon or discount codes into e-commerce checkout pages matching promotions offered to a visiting client.

5. The dynamic personalization e-commerce system of claim 3, wherein the promotion server is configured to track visiting clients across multiple visits.

6. The dynamic personalization e-commerce system of claim 5, wherein the promotions include promotions based on multi-visit tendencies of visiting client.

7. A method of providing dynamic, personal web content, comprising:

operating a web server computer to deliver one or more webpages, wherein each of the one or more webpages includes a same single code snippet, in addition to displayable webpage content, wherein the same single code snippet is the same on all of the one or more webpages and does not identify any specific promotion, and wherein the same single code snippet is not associated with any specific advertising region within the displayable webpage content;

receiving, at a promotion server computer, a request for promotions from execution of the same single code snippet within a web browser of a visiting client accessing a webpage in the one or more webpages;

determining, by the promotion server computer, if the visiting client, contents of the webpage, and time of visit match a promotion configured to generate specific dynamic content for a visitor meeting defined criteria during an identified period displayable on identified webpages or identified webpage elements;

transmitting one or more determined promotions from the promotion server computer to the visiting client web browser for execution within the web browser to dynamically modify the webpage; and executing, by the web browser while rendering the webpage during the webpage access, code contained in the determined promotions and adding to, modifying, or deleting from the displayable webpage content, wherein said code has access to add, modify, or delete any element within a document object model of the webpage.

8. The method of claim 7, further comprising programmatically scraping, by the promotion server computer, all publicly visible webpages on the web server and building a catalog of all available items, categories, and brands offered, and building the document object model of the webpage and a document object model of each other webpage of the one or more every webpages.

9. The method of claim 7, further comprising tracking all visiting clients from a first visited page to a last visited page.

10. The method of claim 9, further comprising dynamically inserting coupon or discount codes into e-commerce checkout pages matching promotions offered to a visiting client.

11. The method of claim 9, further comprising tracking visiting clients across multiple visits.

12. The method of claim 11, further comprising offering promotions based on multi-visit tendencies of visiting client.

* * * * *